United States Patent
Yang

(10) Patent No.: US 8,919,952 B2
(45) Date of Patent: Dec. 30, 2014

(54) EYEGLASS TEMPLE HAVING AN AUXILIARY CUSHION FRAME

(75) Inventor: Shun-Tien Yang, Tainan City (TW)

(73) Assignee: Gateway Safety, Inc., Cleveland, OH (US)

( * ) Notice: Subject to any disclaimer, the term of this patent is extended or adjusted under 35 U.S.C. 154(b) by 0 days.

(21) Appl. No.: 13/314,620

(22) Filed: Dec. 8, 2011

(65) Prior Publication Data

US 2012/0169991 A1 Jul. 5, 2012

(30) Foreign Application Priority Data

Dec. 30, 2010 (TW) .............................. 099225575 U

(51) Int. Cl.
*G02C 5/14* (2006.01)
*G02C 1/00* (2006.01)

(52) U.S. Cl.
CPC .................................... *G02C 5/143* (2013.01)
USPC ............................ 351/119; 351/120; 351/158

(58) Field of Classification Search
USPC .............. 351/119, 120, 142, 130, 158, 43, 62
See application file for complete search history.

(56) References Cited

U.S. PATENT DOCUMENTS

| RE36,762 E  * | 7/2000 | Canavan et al. ............... 351/120 |
| 6,278,788 B1 * | 8/2001 | Landis et al. ........................ 2/13 |
| 6,565,208 B1 * | 5/2003 | Lee ............................... 351/122 |

* cited by examiner

*Primary Examiner* — Ricky Mack
*Assistant Examiner* — Mustak Choudhury
(74) *Attorney, Agent, or Firm* — Fay Sharpe LLP

(57) ABSTRACT

An eyeglass temple includes a main frame adapted for connection with a lens unit, and an auxiliary cushion frame disposed behind the main frame. The auxiliary cushion frame includes an ear engaging portion, a main connecting portion extending forwardly from the ear engaging portion to connect with the main connecting portion, an abutment portion extending forwardly from the ear engaging portion and adapted to be disposed between the main connecting portion and the wearer's head, and at least one resilient connecting portion connected between the main connecting portion and the abutment portion and adapted for biasing the abutment portion away from the main connecting portion toward the wearer's head.

20 Claims, 4 Drawing Sheets

EYEGLASS TEMPLE HAVING AN AUXILIARY CUSHION FRAME

CROSS-REFERENCE TO RELATED APPLICATION

This application claims priority of Taiwanese Application No. 099225575, filed on Dec. 30, 2010.

BACKGROUND OF THE INVENTION

1. Field of the Invention

This invention relates to an eyeglass temple, and more particularly to an eyeglass temple having an auxiliary cushion frame.

2. Description of the Related Art

A pair of conventional eyeglasses typically includes a lens unit and two temples connected respectively to left and right sides of the lens unit and flanking the wearer's head. In case that the head clamping force of the temples is too small, the eyeglasses cannot be worn stably on the wearer's head. Conversely, in case that the head clamping force of the temples is too large, discomfort will be caused to the wearer's head.

SUMMARY OF THE INVENTION

The object of this invention is to provide an eyeglass temple that can facilitate the eyeglasses to be worn stably and comfortably on the wearer's head.

According to this invention, an eyeglass temple includes a main frame adapted for connection with a lens unit, and an auxiliary cushion frame disposed behind the main frame. The auxiliary cushion frame includes an ear engaging portion, a main connecting portion extending forwardly from the ear engaging portion to connect with the main connecting portion, an abutment portion extending forwardly from the ear engaging portion and adapted to be disposed between the main connecting portion and a wearer's head, and at least one resilient connecting portion connected between the main connecting portion and the abutment portion and adapted for biasing the abutment portion away from the main connecting portion toward the wearer's head.

As such, since the abutment portion is biased by the resilient connecting portion to contact the wearer's head, the eyeglasses can be worn stably and comfortably on the wearer's head.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
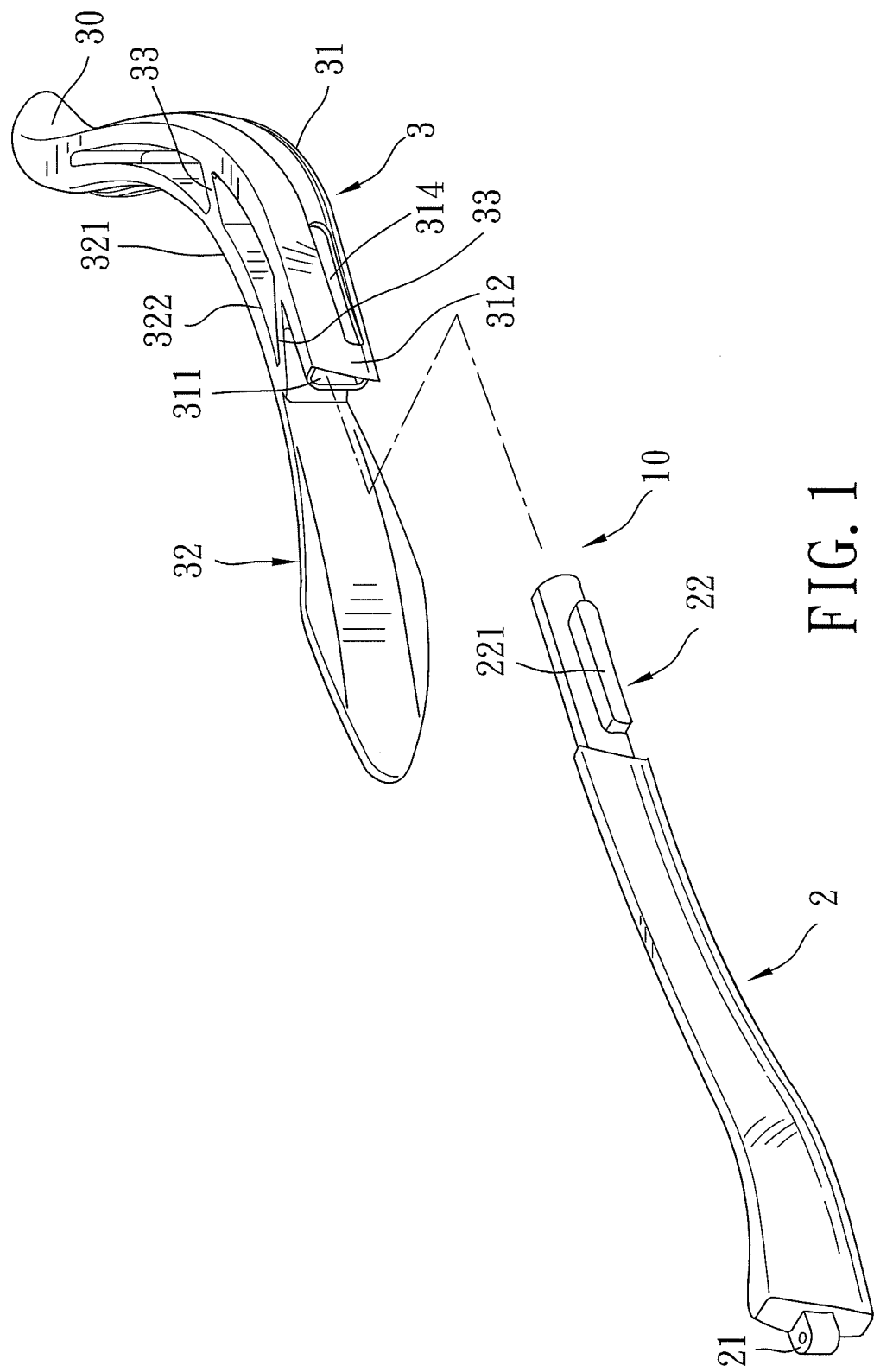
FIG. 1 is an exploded perspective view of the preferred embodiment of an eyeglass temple according to this invention.
Figure 2:
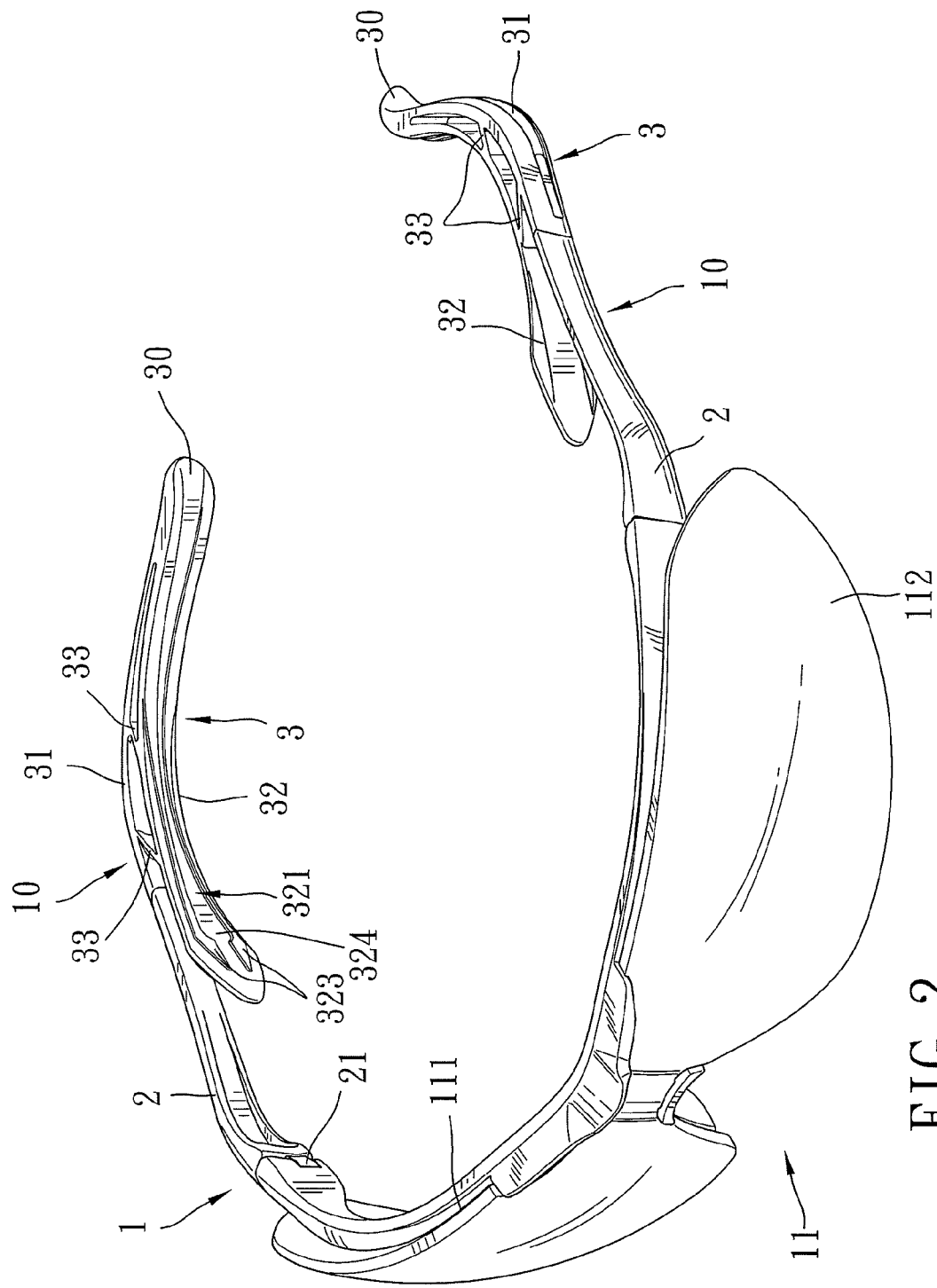
FIG. 2 is a perspective view of a pair of eyeglasses including the preferred embodiment.
Figure 3:
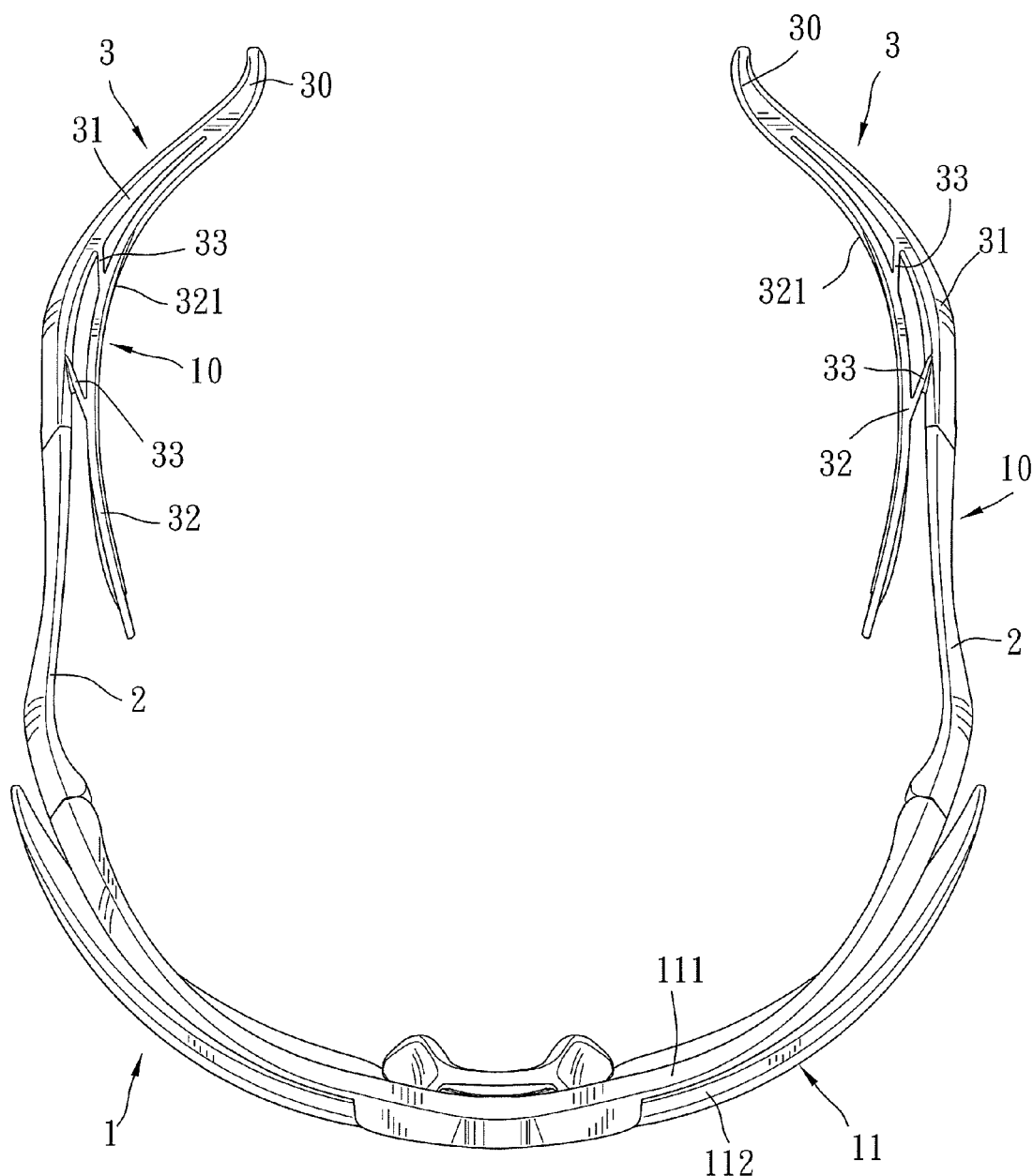
FIG. 3 is a top view of the eyeglasses.

Referring to FIGS. 1, 2, and 3, the preferred embodiment of an eyeglass temple 10 according to this invention forms a portion of a pair of eyeglasses 1. In this embodiment, a lens unit 11 of the eyeglasses 1 has a half frame construction, and includes a frame 111 and two lenses 112 mounted fixedly to the frame 111. The temple 10 is connected pivotally to the frame 111. In practice, the lens unit 11 may have a rimless or full frame construction.

Figure 4:
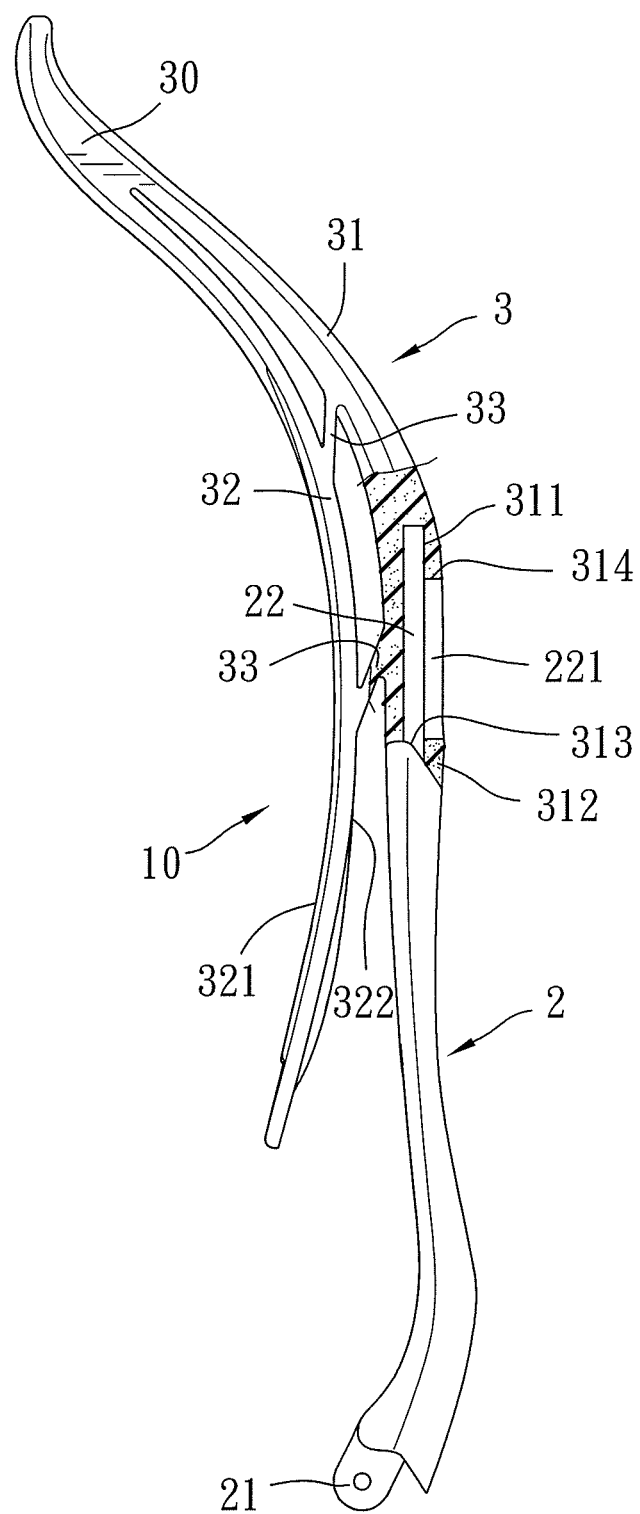
FIG. 4 is a sectional view of the preferred embodiment.

With additional reference to FIG. 4, the temple 10 includes a main frame 2 and an auxiliary cushion frame 3 sleeved on and disposed behind the main frame 2. The main frame 2 includes a pivotal connection portion 21 disposed at a front end thereof and connected pivotally to the frame 111, and an engagement portion 22 disposed at a rear end portion thereof. The engagement portion 22 has an engaging protrusion 221 extending from an outer side thereof.

The auxiliary cushion frame 3 is made of a soft material, such as rubber, silicone, etc., and includes an ear engaging portion 30 disposed at a rear end thereof (i.e., an end thereof distal from the lens unit 11), a main connecting portion 31 extending forwardly from the ear engaging portion 30 to connect with the engagement portion 22 of the main frame 2, an abutment portion 32 extending forwardly from the ear engaging portion 30 and adapted to be disposed between the main connecting portion 31 and the wearer's head, and two resilient connecting portions 33 connected resiliently between the main connecting portion 31 and the abutment portion 32 for biasing the abutment portion 32 away from the main connecting portion 31 toward the wearer's head. The main connecting portion 31 has a loop-shaped wall 312 that defines an insert groove 311 and that permits insertion of the engagement portion 22 of the main frame 2 thereinto. The loop-shaped wall 312 has an engaging hole 314 in spatial communication with the insert groove 311 for engaging the engaging protrusion 221 of the main frame 2. As such, the engagement portion 22 of the main frame 2 is snapped into the main connecting portion 31 of the auxiliary cushion frame 3. Alternatively, the engagement portion 22 may be connected integrally to the main connecting portion 31.

The abutment portion 32 has a curved inner side surface 321 facing the wearer's head, and an outer side surface 322 facing and spaced apart from the main connecting portion 31. The inner side surface 321 is formed with two ribs 323 that extend respectively along top and bottom sides thereof and that define cooperatively a concaved surface area 324 therebetween. Each of the resilient connecting portions 33 is configured as a strip, and extends rearwardly and outwardly from the abutment portion 32 to connect with the main connecting portion 31. If necessary, the number of the resilient connecting portions 33 may be changed according to practice demand to allow the abutment portion 32 to be pressed resiliently against the wearer's head.

When assembly of the main frame 2 and the auxiliary cushion frame 3 is desired, it is only necessary to insert the engagement portion 22 of the main frame 2 into the insert groove 311 of the auxiliary cushion frame 3 until the engaging protrusion 221 of the engagement portion 22 is engaged within the engaging hole 314 in the auxiliary cushion frame 3.

Since the abutment portion 32 of the auxiliary cushion frame 3 is biased to press resiliently against the wearer's head, the eyeglasses 20 can be worn stably and comfortably on the wearer's head. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. An eyeglass temple adapted for connection with a lens unit, said eyeglass temple comprising:
   a main frame including a frame end adapted for connection with the lens unit; and,
   an auxiliary cushion frame disposed behind said main frame and including:
      an ear engaging portion;
      a main connecting portion extending forwardly from said ear engaging portion to connect with said main frame;
      an abutment portion extending forwardly from said ear engaging portion to a free end disposed beyond said main connecting portion toward said frame end, said free end disposed in spaced relation to said main frame and extending therealong unsupported by said main frame, said abutment portion adapted to be disposed between said main connecting portion and a wearer's head in a left-and-right direction; and,
      at least one resilient connecting portion connected between said main connecting portion and said abutment portion and adapted for biasing said abutment portion away from said main connecting portion to contact the wearer's head in the left-to-right direction, said abutment portion having an outer side surface facing and spaced apart from said main connecting portion.

2. The eyeglass temple as claimed in claim 1, wherein one of said main frame and said auxiliary cushion frame is snapped into the other of said main frame and said auxiliary cushion frame.

3. The eyeglass temple as claimed in claim 2, wherein said main frame has an engagement portion at a rear end portion thereof, and said main connecting portion of said auxiliary cushion frame having a loop-shaped wall that defines an insert groove and that permits insertion of said engagement portion thereinto.

4. The eyeglass temple as claimed in claim 3, wherein said loop-shaped wall has an engaging hole in spatial communication with said insert groove, and said engagement portion of said main frame has an engaging protrusion for engaging said engaging hole.

5. The eyeglass temple as claimed in claim 1, wherein said abutment portion of said auxiliary cushion frame further has a curved inner side surface adapted to face the wearer's head, said inner side surface being formed with two ribs that extend respectively along top and bottom sides thereof and that define cooperatively a concaved surface area therebetween.

6. The eyeglass temple as claimed in claim 1, wherein said resilient connecting portion is configured as a strip, and extends rearwardly and outwardly from said abutment portion to connect with said main connecting portion, so that a space is formed among said main connecting portion, said outer side surface of said abutment portion, and said resilient connecting portion.

7. An eyewear assembly comprising:
   a frame having a frame width extending between opposing first and second frame sides and defining a widthwise direction extending from frame side-to-frame side, said frame including a first pivotal connection point disposed on said frame along said first frame side and a second pivotal connection point disposed on said frame along said second frame side;
   at least one lens supported on said frame, said at least one lens having a lens height extending in a heightwise direction that is transverse to said widthwise direction; and,
   first and second temple assemblies pivotally supported in spaced relation to one another in said widthwise direction on said frame, said first and second temple assemblies having a temple length and defining a lengthwise direction extending along said length of said first and second temple assemblies, said first and second temple assemblies pivotally displaceable into at least a first position in which said first and second temples extend in a lengthwise direction transverse to said widthwise and said heightwise directions, said first and second temples including:
      a temple frame extending in said lengthwise direction between a pivotal connection portion disposed along a first end of said temple frame and an engagement portion disposed along a second end of said temple frame disposed in said lengthwise direction relative to said first end of said temple frame; and,
      an auxiliary cushion supported on said engagement portion of said temple frame, said auxiliary cushion including:
         a main connecting portion operatively connected to said engagement portion of said temple frame and extending in said lengthwise direction away from said pivotal connection portion of said temple frame toward a distal end; and,
         an abutment portion connected to said main connecting portion at said distal end and extending from said distal end in said lengthwise direction to a cantilevered free end disposed beyond said main connecting portion, said cantilevered free end of said abutment portion disposed in spaced relation to said temple frame in said widthwise direction such that said cantilevered free end extends unsupported along at least a portion of said temple frame in a direction toward said pivotal connection portion.

8. An eyewear assembly according to claim 7, wherein said abutment portion is spaced inward in said widthwise direction relative to said main connecting portion.

9. An eyewear assembly according to claim 8, wherein said main connecting portion includes a first surface facing inward in said widthwise direction and said abutment portion includes a first surface facing outward in said widthwise direction and in facing relation to said first surface of said main connecting portion such that a gap is formed therebetween.

10. An eyewear assembly according to claim 9, wherein said auxiliary cushion includes a resilient connecting portion extending between and operatively connecting said first surface of said main connecting portion and said first surface of said abutment portion.

11. An eyewear assembly according to claim 10, wherein said resilient connecting portion extends outward from along said abutment portion and in said lengthwise direction toward said distal end of said auxiliary cushion.

12. An eyewear assembly according to claim 10, wherein said auxiliary cushion includes a plurality of resilient connecting portions disposed in spaced relation to one another in said lengthwise direction, said plurality of resilient connecting portions extending between and operatively connecting said first surface of said main connecting portion and said first surface of said abutment portion.

13. An eyewear assembly according to claim 7, wherein said auxiliary cushion includes a passage extending into said main connecting portion in lengthwise direction, said passage receiving at least a portion of said engagement portion of said temple frame.

14. An eyewear assembly according to claim 13, wherein said auxiliary cushion includes an engaging hole extending through said main connecting portion such that said engaging hole is in communication with said passage of said main connecting portion, said engaging hole extending through said main connecting portion in a direction transverse to said lengthwise direction.

15. An eyewear assembly according to claim 14, wherein said engagement portion of said temple frame includes an engaging protrusion extending in said direction transverse to said lengthwise direction of said engaging hole such that at least a portion of said engaging protrusion can extend into said engaging hole and abuttingly engage said main connecting portion.

16. An eyewear assembly comprising:
a frame having a frame width extending between opposing first and second frame sides and defining a widthwise direction extending from frame side-to-frame side, said frame including a first pivotal connection point disposed on said frame along said first frame side and a second pivotal connection point disposed on said frame along said second frame side;
at least one lens supported on said frame, said at least one lens having a lens height extending in a heightwise direction that is transverse to said widthwise direction; and,
first and second temple assemblies pivotally supported in spaced relation to one another in said widthwise direction on said frame, said first and second temple assemblies having a temple length and defining a lengthwise direction extending along said length of said first and second temple assemblies, said first and second temple assemblies pivotally displaceable into at least a first position in which said first and second temples extend in a lengthwise direction transverse to said widthwise and said heightwise directions, said first and second temples including:
a temple frame extending in said lengthwise direction between a pivotal connection portion disposed along a first end of said temple frame and an engagement portion disposed along a second end of said temple frame disposed in said lengthwise direction relative to said first end of said temple frame; and,
an auxiliary cushion supported on said engagement portion of said temple frame, said auxiliary cushion including:
a main connecting portion operatively connected to said engagement portion of said temple frame and extending in said lengthwise direction away from said pivotal connection portion of said temple frame toward a distal end;
an abutment portion connected to said main connecting portion at said distal end and extending from said distal end in said lengthwise direction toward said pivotal connection portion, said abutment portion spaced inwardly from said main connecting portion in said widthwise direction; and,
at least two resilient connecting portions disposed in spaced relation in said lengthwise direction to said distal end of said main connecting portion, said at least two resilient connecting portions extending between and operatively connecting said main connecting portion and said abutment portion, said at least two resilient connecting portions biasing said abutment portion away from said main connecting portion in a widthwise direction, and said at least two resilient connecting portions disposed in spaced relation to one another in said lengthwise direction and defining at least two cavity between said main connecting portion and said abutment portion, said at least two cavities extending through said auxiliary cushion in said heightwise direction.

17. An eyewear assembly according to claim 16, wherein said abutment portion extends from said distal end in said lengthwise direction to a cantilevered free end disposed beyond said main connecting portion and extending unsupported along at least a portion of said temple frame in a direction toward said pivotal connection portion.

18. An eyewear assembly according to claim 16, wherein said at least two resilient connecting portions extend at an angle from said abutment portion in a lengthwise and outward direction to connect with said main connecting portion.

19. An eyewear assembly according to claim 16, wherein said abutment portion includes a first surface facing inward in said widthwise direction away from said main connecting portion, and said abutment portion includes at least one elongated rib extending in said lengthwise direction along said first surface.

20. An eyewear assembly according to claim 19, wherein said at least one elongated rib includes at least two ribs disposed in spaced relation to one another that cooperatively define a concave area along said first surface of said abutment portion.

* * * * *